Patented Nov. 19, 1946

2,411,428

UNITED STATES PATENT OFFICE 2,411,428

AROMATIC SUBSTITUTED METHYL ALKYL ETHERS AS INSECTICIDES

Ingenuin Hechenbleikner, Stamford, Conn., assignor to American Cyanamid Company, New York, N. Y., a corporation of Maine No Drawing. Application May 31, 1940, Serial No. 338,047

1 Claim. (Cl. 167—30)

The present invention relates to insecticides and more particularly to a class of compounds which are especially effective as contact poisons for the control of insect pests.

I have discovered that aromatic substituted methyl alkyl ethers of the general formula:

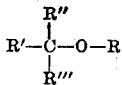

in which R is an alkyl radical, R' is an aryl radical, and R'' and R''' are selected from the group consisting of hydrogen and an aryl radical, possess high insecticidal activity against insects which are particularly difficult to exterminate, for example, the red spider, and that such activity is attained without any substantial harmful or detrimental action on the vegetation infested with the insect.

The following examples illustrate in detail the preparation of representative compounds of the invention. Materials employed are in parts by weight.

Example 1

10 parts of triphenylmethyl chloride were added to a solution consisting of 0.83 part of metallic sodium dissolved in 50 parts of methyl alcohol. The mixture was heated one hour upon a steam bath and then poured into water. The triphenylmethyl methyl ether precipitated as a colorless crystalline solid. After recrystallization from ethyl alcohol the product melted at 84° C.

Example 2

To a solution consisting of 0.84 part of metallic sodium dissolved in 40 parts of ethyl alcohol were added 10 parts of triphenylmethyl chloride. The mixture was refluxed for 30 minutes upon a water bath and then filtered while hot from the sodium chloride. 5 parts of water were added to the filtrate. Upon cooling the solution to room temperature the triphenylmethyl ethyl ether separated in the form of colorless crystals having a melting point of 84° C.

Example 3

10 parts of triphenylmethyl chloride were added to a solution consisting of 0.83 part of metallic sodium dissolved in 10 parts of butyl alcohol. The mixture was heated upon a steam bath for one hour, then poured into water and extracted with ether. The ether extract was washed with a large volume of water and dried over sodium sulfate. The triphenylmethyl butyl ether crystallized after evaporation of the ether. After recrystallization from ethyl alcohol the product had a melting point of 50° C.

Example 4

12 parts of 1-naphthylmethyl chloride were added slowly to a solution consisting of 2 parts of sodium dissolved in 20 parts of butyl alcohol. The mixture was heated for 3 hours upon a steam bath. The reaction product was washed with a large volume of water, dried over sodium sulfate and distilled. The 1-naphthylmethyl butyl ether was recovered as a slightly colored viscous oil boiling at 125° C. at 1 mm. pressure.

Example 5

3 parts of metallic sodium, 50 parts of tetradecyl alcohol and 45 parts of benzene were placed in a vessel fitted with a reflux condenser. The mixture was refluxed for 48 hours under an atmosphere of hydrogen. The sodium had dissolved at the end of this period. 23 parts of 1-naphthylmethyl chloride were added and the mixture refluxed for an additional 24 hours. The reaction product was extracted with ether, washed with water, dried over sodium sulfate and distilled. The 1-naphthylmethyl tetradecyl ether was recovered as a slightly yellow oil boiling at 165° C. at less than 1 mm. pressure.

Spray solutions were prepared by dissolving the insecticidal compounds in a solvent medium consisting of 65% acetone and 35% water. The following table shows the kills obtained under comparable conditions when the sprays were applied to the citrus red spider.

Table

| Compound | Dilution | Per cent kill |
|---|---|---|
| Triphenylmethyl methyl ether | [1] 1–1000 | 100 |
| Do | 1–2000 | 97.7 |
| Triphenylmethyl ethyl ether | 1–1000 | 100 |
| Do | 1–2000 | 99.5 |
| Do | 1–4000 | 91.8 |
| Triphenylmethyl butyl ether | [1] 1–1000 | 100 |
| Do | 1–2000 | 99.5 |
| 1-naphthylmethyl butyl ether | 1–1000 | 100 |
| Do | 1–2000 | 96.6 |
| 1-naphthylmethyl tetradecyl ether | [1] 1–1000 | 100 |
| Do | 1–2000 | 97.6 |
| Do | 1–4000 | 92.5 |

[1] A 100% kill of the red spider eggs is obtained in conjunction with the 100% kill of the active forms.

It is believed that the triphenylmethyl butyl ether, 1-naphthylmethyl butyl ether, and 1-naphthylmethyl tetradecyl ether are new compounds.

The group of chemical compounds of this invention includes other members of which the following are typical: phenylmethyl octyl ether, phenylmethyl decyl ether, phenylmethyl tetradecyl ether, diphenylmethyl propyl ether, diphenylmethyl butyl ether, diphenylmethyl octyl ether, diphenylmethyl decyl ether, diphenylmethyl lauryl ether, triphenylmethyl octyl ether, triphenylmethyl lauryl ether, 1-naphthylmethyl octyl ether, 1-naphthylmethyl decyl ether, 1-naphthylmethyl lauryl ether, di-1-naphthylmethyl propyl ether, di-1-naphthylmethyl butyl ether, di-1-naphthylmethyl octyl ether, di-1-naphthylmethyl decyl ether, and di-1-naphthylmethyl lauryl ether.

These new insecticides may be applied in any of the conventional manners. Thus, for example, they may be incorporated in liquids for spraying purposes, or they may be effectively used in dusts with such inert solid diluents as kieselguhr, wood flour, walnut shell, talc, and the like.

While the invention has been described with particular reference to specific embodiments it is to be understood that it is not to be limited thereto but is to be construed broadly and restricted solely by the scope of the appended claim.

What I claim is:

A method of combatting insect pests which includes exposing them to the action of a toxic amount of a composition containing as an essential active ingredient triphenylmethyl methyl ether.

INGENUIN HECHENBLEIKNER.